(12) United States Patent  (10) Patent No.: US 8,882,567 B2
Liu  (45) Date of Patent: Nov. 11, 2014

(54) POLISHING MECHANISM AND MANIPULATOR USING THE POLISHING MECHANISM

(71) Applicant: You-Yuan Liu, Shenzhen (CN)

(72) Inventor: You-Yuan Liu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 212 days.

(21) Appl. No.: 13/649,615

(22) Filed: Oct. 11, 2012

(65) Prior Publication Data

US 2013/0244551 A1    Sep. 19, 2013

(51) Int. Cl.
*B24B 27/00*    (2006.01)

(52) U.S. Cl.
USPC ............. 451/270; 451/64; 451/340; 451/363; 451/361

(58) Field of Classification Search
CPC .. B24B 27/0076; B24B 37/345; B24B 37/30; B24B 37/24; B24B 57/02; B24B 21/04; B24B 45/00; B24B 45/006; B24B 7/16; B24B 41/04; B24D 5/16
USPC ............................ 451/64, 270, 340, 363, 361
See application file for complete search history.

(56) References Cited

U.S. PATENT DOCUMENTS

| | | | | |
|---|---|---|---|---|
| 2,826,013 A * | 3/1958 | Fasulo et al. | | 451/340 |
| 3,431,685 A * | 3/1969 | Hahn | | 451/340 |
| 3,654,737 A * | 4/1972 | Schmidt | | 451/26 |
| 3,708,922 A * | 1/1973 | Gluchowicz | | 451/26 |
| 3,914,854 A * | 10/1975 | Tsuchiya | | 483/33 |
| 3,924,357 A * | 12/1975 | Schmidt et al. | | 451/86 |
| 4,173,847 A * | 11/1979 | Gehring et al. | | 451/19 |
| 4,275,531 A * | 6/1981 | Van Fossen | | 451/88 |
| 4,455,789 A * | 6/1984 | Gehring | | 451/156 |
| 4,461,121 A * | 7/1984 | Motzer et al. | | 451/5 |
| 4,589,234 A * | 5/1986 | Rebhan et al. | | 451/80 |
| 4,592,707 A * | 6/1986 | Borer et al. | | 425/7 |
| 4,610,113 A * | 9/1986 | Fagerroos | | 451/88 |
| 4,657,068 A * | 4/1987 | Peltz | | 165/47 |
| 4,753,044 A * | 6/1988 | Bula | | 451/65 |
| 4,920,700 A * | 5/1990 | Murahashi et al. | | 451/277 |
| 5,102,099 A * | 4/1992 | Brown et al. | | 451/283 |
| 5,323,562 A * | 6/1994 | Puschner | | 451/89 |
| 5,362,027 A * | 11/1994 | Champaigne et al. | ... | 251/129.01 |
| 5,431,593 A * | 7/1995 | Puschner | | 451/75 |
| 5,738,574 A * | 4/1998 | Tolles et al. | | 451/288 |
| 5,893,793 A * | 4/1999 | Nishio et al. | | 451/49 |
| 6,113,475 A * | 9/2000 | Masuda et al. | | 451/76 |
| 6,261,160 B1 * | 7/2001 | Hakomori | | 451/66 |
| 6,328,631 B1 * | 12/2001 | Fukano et al. | | 451/39 |
| 6,413,152 B1 * | 7/2002 | Sengupta et al. | | 451/66 |
| 6,966,823 B2 * | 11/2005 | Bauer et al. | | 451/41 |

(Continued)

*Primary Examiner* — George Nguyen
(74) *Attorney, Agent, or Firm* — Novak Druce Connolly Bove + Quigg LLP (57) ABSTRACT

A polishing mechanism includes a support base, a pair of magnetic valves, a first polishing assembly and a second polishing assembly. The pair of magnetic valves are mounted in the support base. The first polishing assembly and the second polishing assembly are mounted on the support base and connected to the pair of magnetic valves respectively. The second polishing assembly is arranged perpendicular to the first polishing assembly. The first and the second polishing assemblies are respectively controlled by the pair of magnetic valves to polish one or more workpieces. The present disclosure further discloses a manipulator using the polishing mechanism.

20 Claims, 7 Drawing Sheets

(56) References Cited

U.S. PATENT DOCUMENTS

| | | | |
|---|---|---|---|
| 7,044,841 B1* | 5/2006 | Liao | 451/67 |
| 7,083,505 B2* | 8/2006 | Carlson, III | 451/66 |
| 7,156,728 B1* | 1/2007 | Killough | 451/361 |
| 7,556,557 B2* | 7/2009 | Rebiere | 451/67 |
| 8,690,640 B2* | 4/2014 | Johannessen | 451/66 |
| 8,694,150 B2* | 4/2014 | Meidar et al. | 700/193 |
| 2002/0142708 A1* | 10/2002 | Bilinovich et al. | 451/49 |
| 2002/0177392 A1* | 11/2002 | Kordonski et al. | 451/60 |
| 2003/0129932 A1* | 7/2003 | Ficarro | 451/288 |
| 2004/0259473 A1* | 12/2004 | Champaigne | 451/5 |
| 2004/0266319 A1* | 12/2004 | Kordonski et al. | 451/5 |
| 2006/0089086 A1* | 4/2006 | Pedersen | 451/8 |
| 2012/0196518 A1* | 8/2012 | Chen et al. | 451/463 |
| 2012/0214388 A1* | 8/2012 | Chen et al. | 451/342 |

\* cited by examiner

FIG. 7

POLISHING MECHANISM AND MANIPULATOR USING THE POLISHING MECHANISM

BACKGROUND

1. Technical Field

The present disclosure relates to polishing mechanisms, and more particularly, to a polishing mechanism for deburring and a manipulator using the polishing mechanism.

2. Description of Related Art

Burrs on metallic workpieces produced by fabrication process are typically removed manually. An operator polishes the metallic workpiece with a sandpaper to remove the burrs. However, such de-burring polishing process is labor-consuming, the work efficiency is relatively low and the workpiece may be fractured easily.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
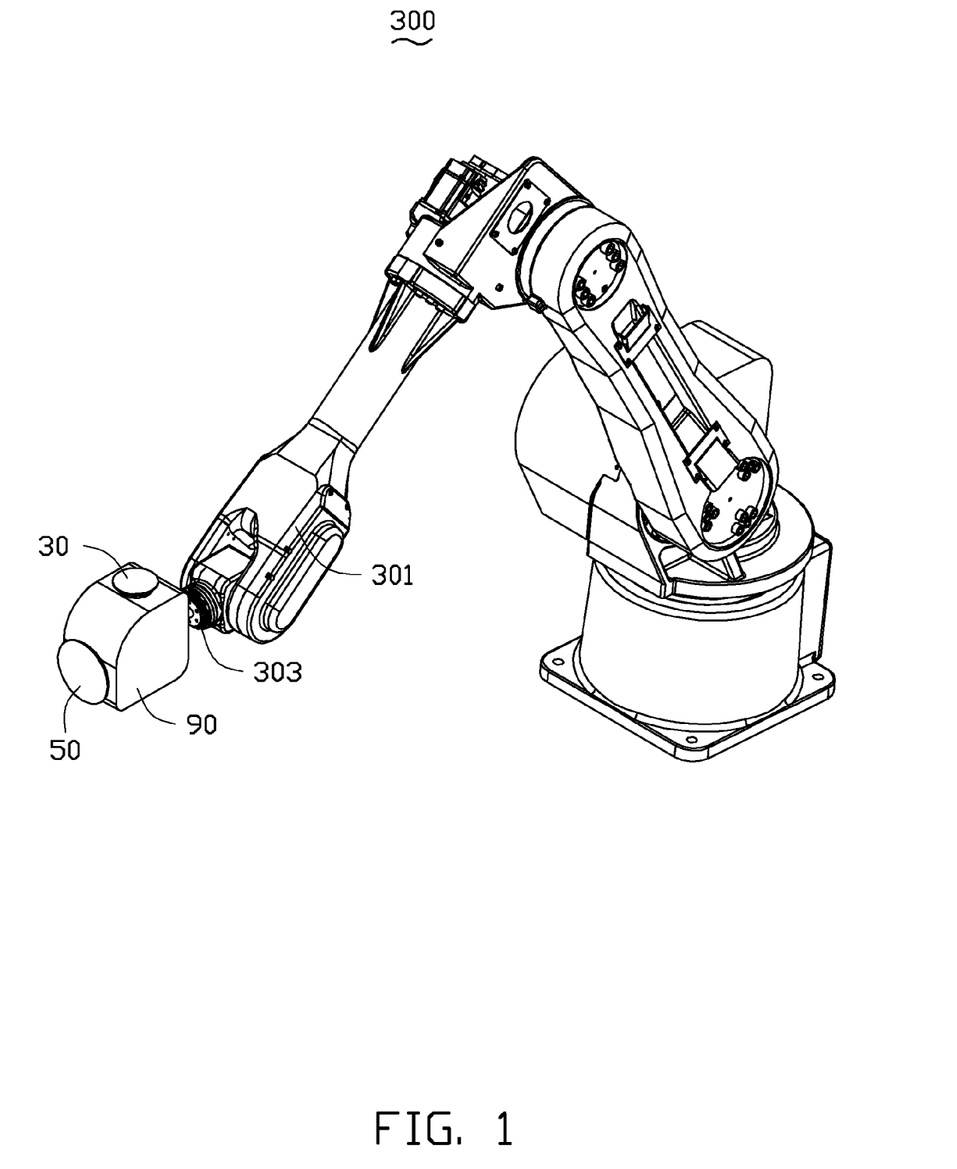
FIG. 1 is an assembled, isometric view of an embodiment of a manipulator having a polishing mechanism.
Figure 2:
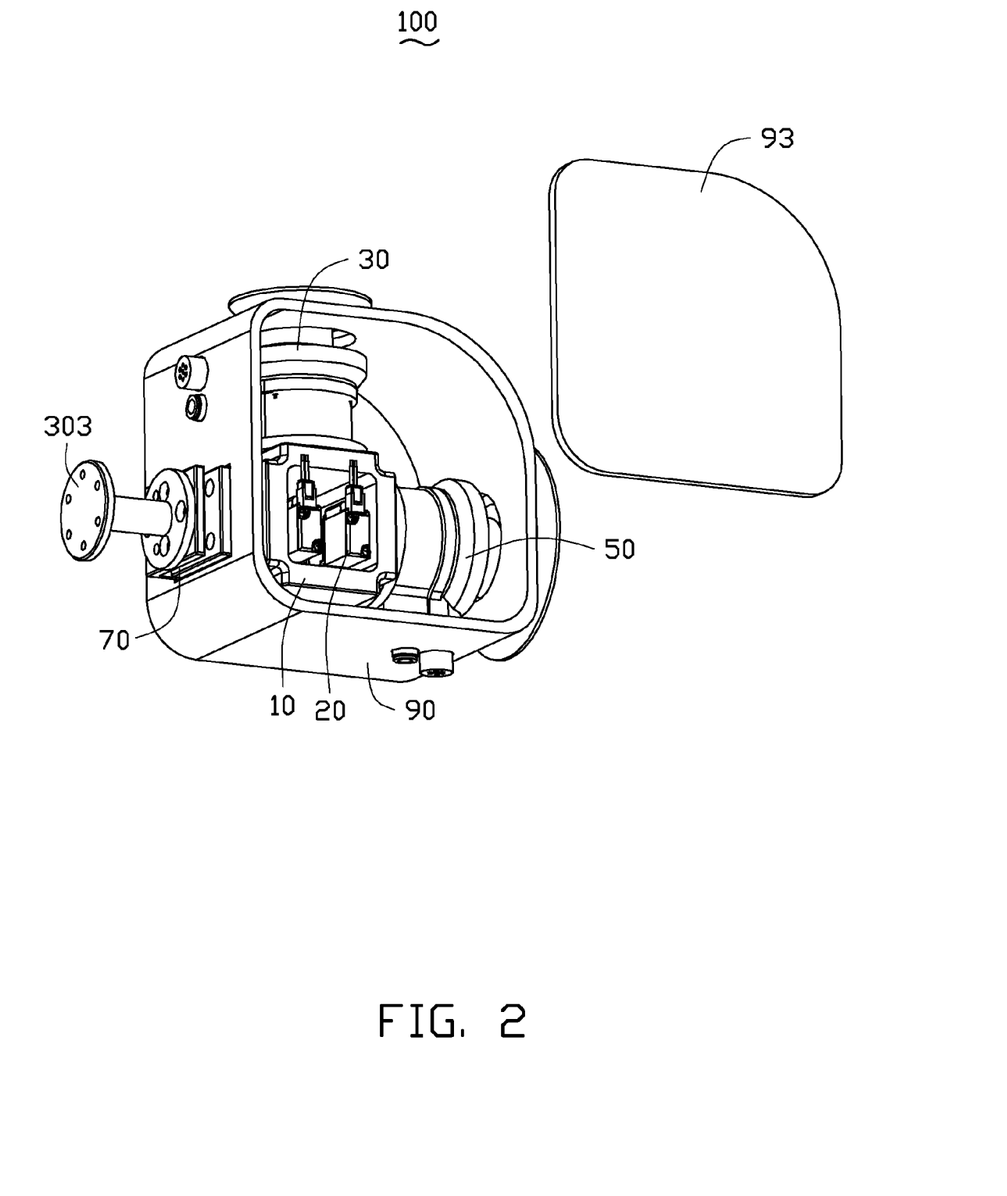
FIG. 2 is a partially assembled, isometric view of the polishing mechanism of the manipulator of FIG. 1, the polishing mechanism having a first polishing assembly.
Figure 7:
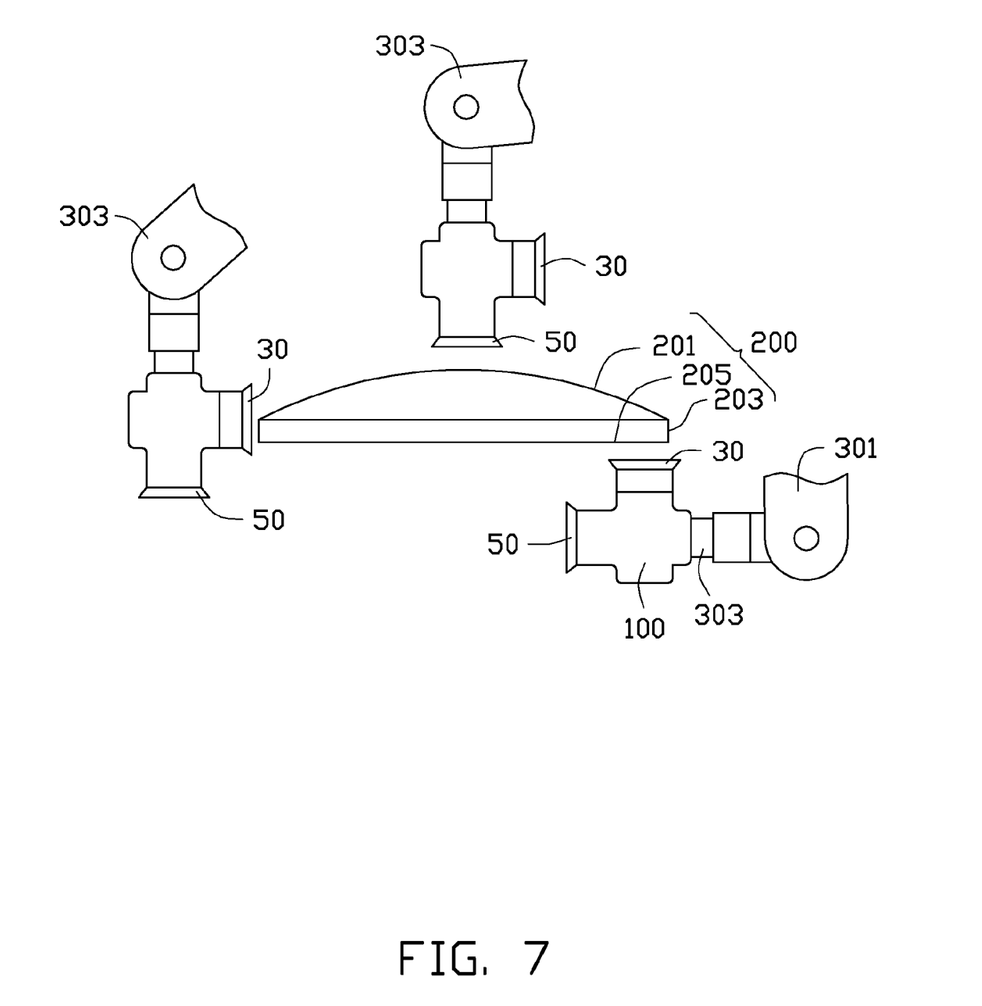
FIG. 7 shows three working state of the manipulator of FIG. 1.

FIGS. 1 and 2 show an embodiment of a manipulator 300 used for removing burrs from a workpiece 200 (see FIG. 7). The manipulator 300 includes an arm 301 having a flange 303, and a polishing mechanism 100 mounted on the flange 303 of the arm 301. In the embodiment, as shown in FIG. 7, the workpiece 200 is turned over, and includes a curved base wall 201, a sidewall 203 extending along a periphery of the base wall 201. A top surface 205 is formed on the sidewall 203 away from the base wall 201.

The polishing mechanism 100 includes a support base 10, a pair of magnetic valves 20, a first polishing assembly 30, a second polishing assembly 50, an adjusting assembly 70 and a shielding cover 90. The pair of magnetic valves 20 are received in the support base 10, and the support base 10 is received in the shielding cover 90. The first polishing assembly 30 and the second polishing assembly 50 are separately mounted on the support base 10 and partially extended out of the shielding cover 90. The adjusting assembly 70 extends through the shielding cover 90 and interconnects the arm 301 with the support base 10. The adjusting assembly 70 is located opposite to the second polishing assembly 50, and the first polishing assembly 30 extends along a direction perpendicularly to the second polishing assembly 50.

Figure 3:
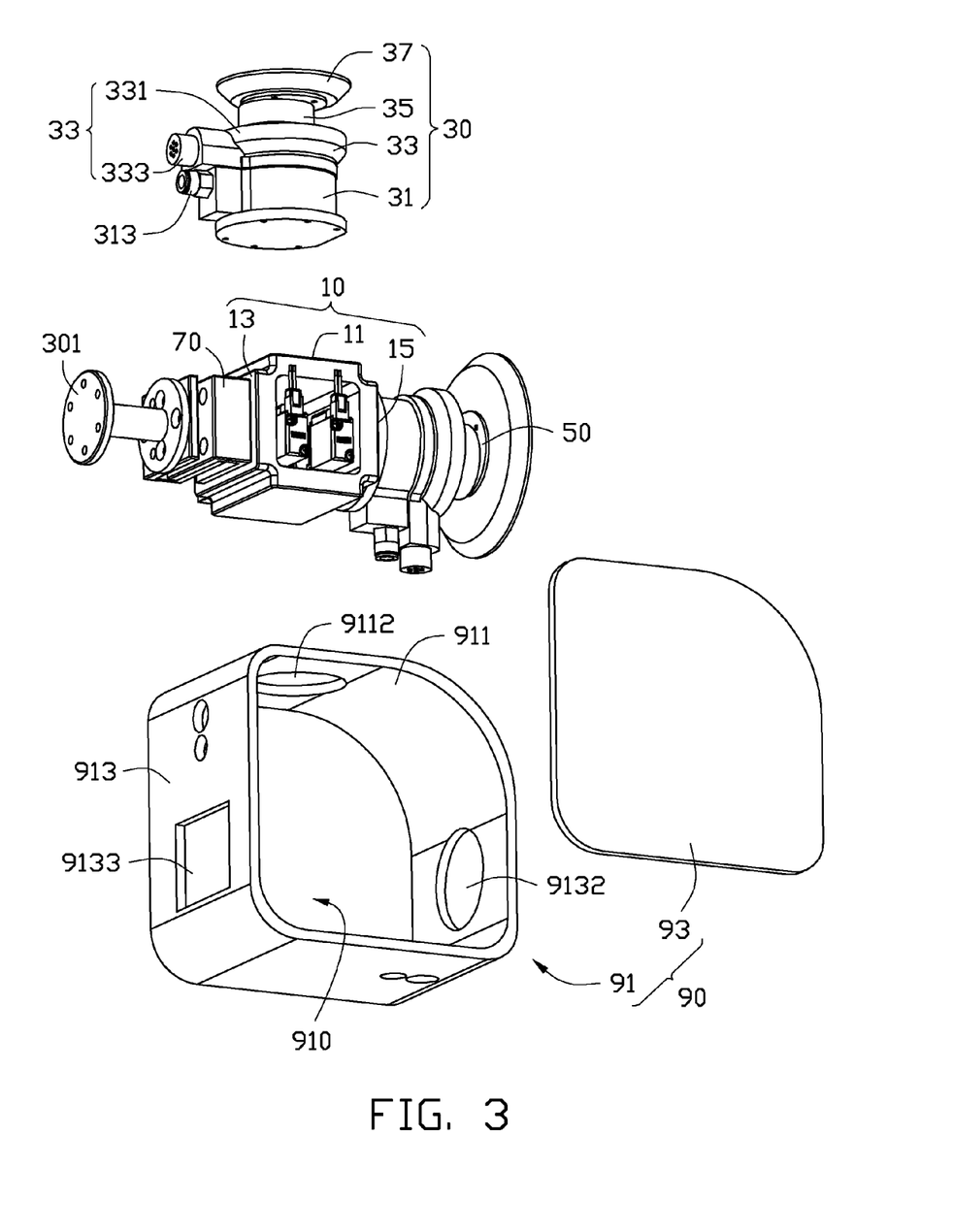
FIG. 3 is an exploded, isometric view of the polishing mechanism of FIG. 2.

Referring to FIG. 3, the support base 10 is substantially a hollow, rectangular structure, which includes a pair of first side walls 11, a second side wall 13 and a third side wall 15. The pair of first side walls 11 are spaced from and parallel to each other. The second side wall 13 and the third side wall 15 are spaced from and parallel to each other. The second side wall 13 and the third side wall 15 are perpendicularly connected to opposite ends of the first side wall 11. The first polishing assembly 30 is mounted on one first side wall 11. The second polishing assembly 50 is mounted on the third sidewall 15, and the adjusting assembly 70 is mounted on the second side wall 13.

The pair of magnetic valves 20 are mounted within the support base 10 and electrically connected to the first polishing assembly 30 and the second polishing assembly 50, respectively. The pair of magnetic valves 20 is also electrically connected to a corresponding electric cabinet of the arm 301 for controlling the first polishing assembly 30 and the second polishing assembly 50.

Figure 4:
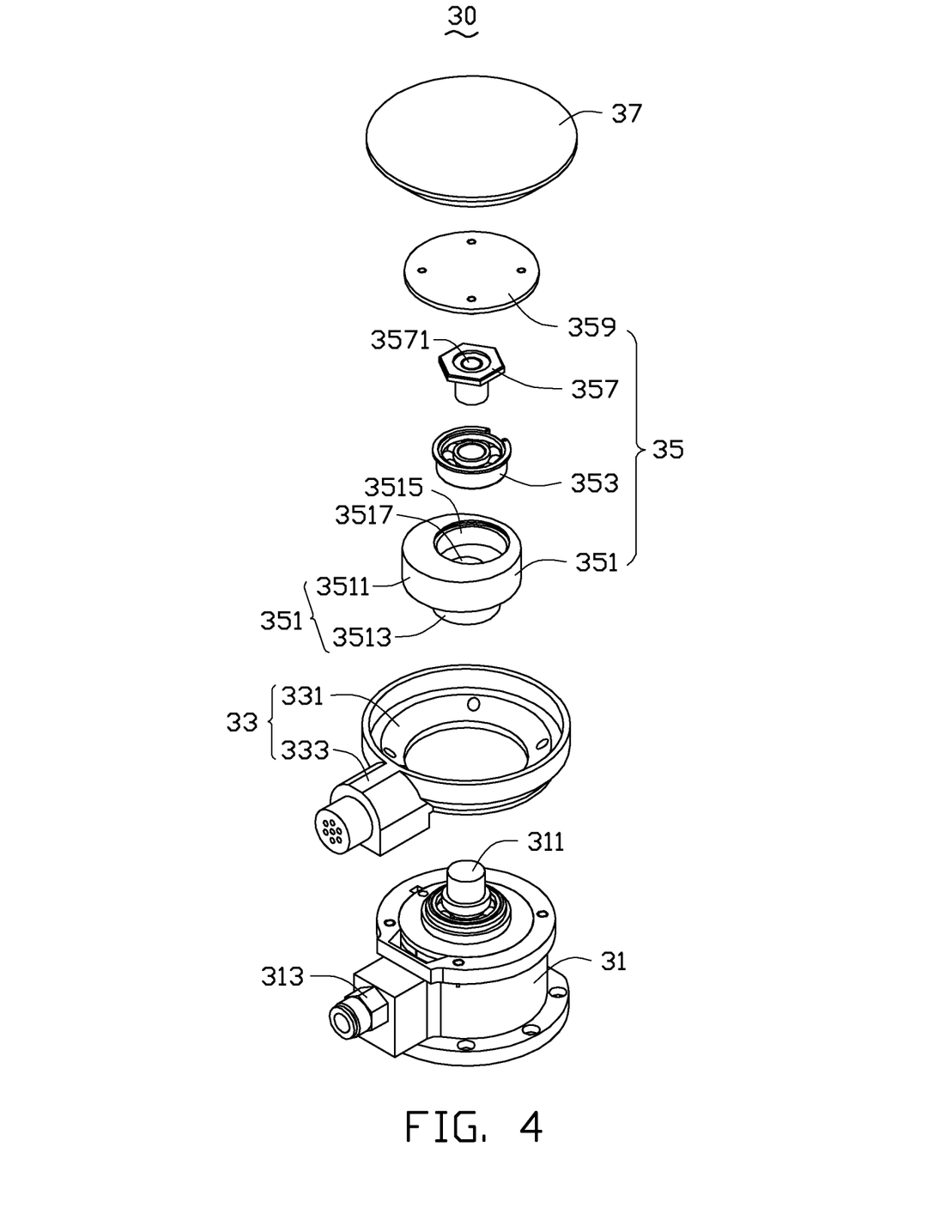
FIG. 4 is an exploded, isometric view of the first polishing assembly of the polishing mechanism of FIG. 2.
Figure 5:
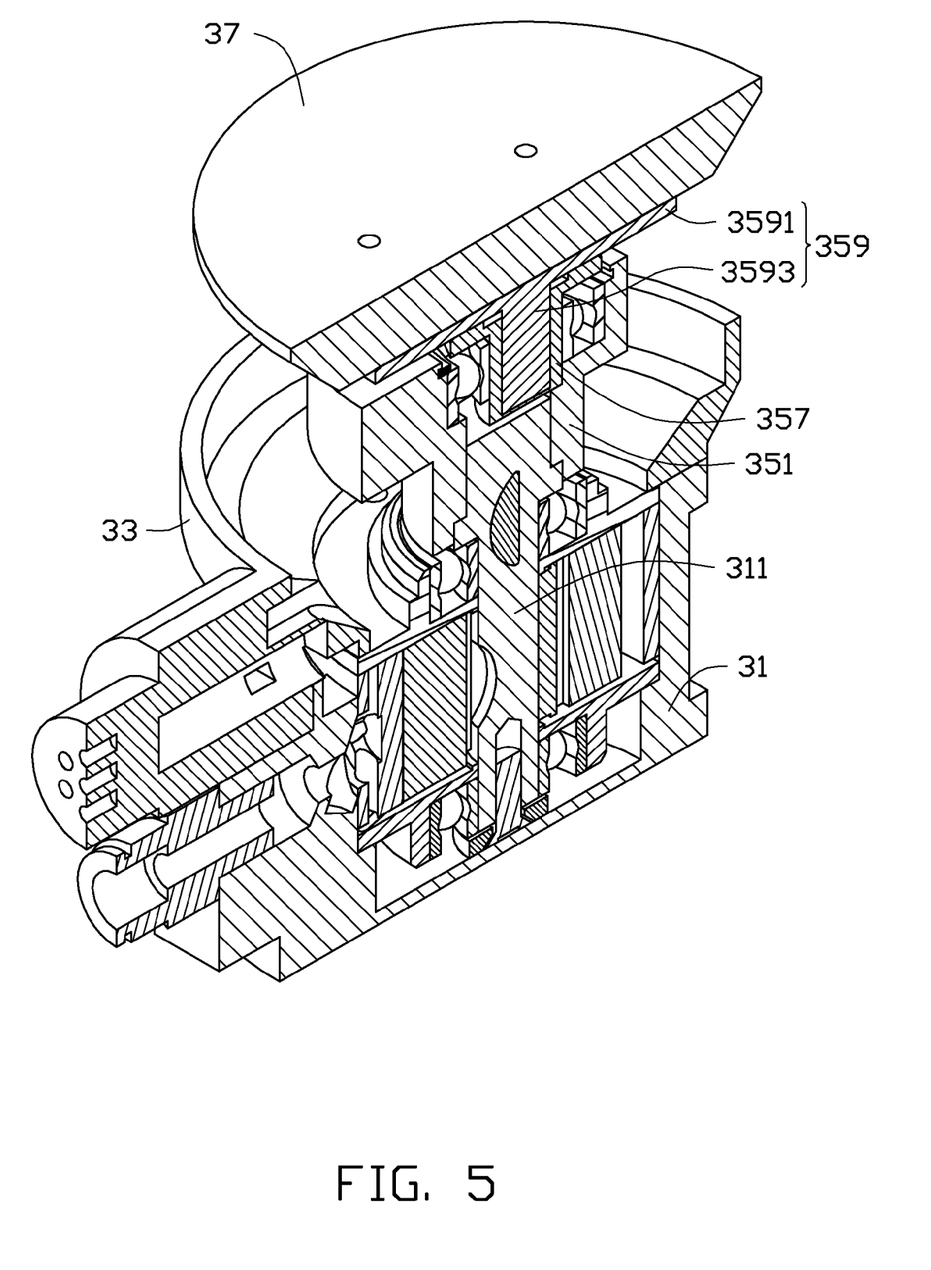
FIG. 5 is a cut-away view of the first polishing assembly of FIG. 4.

Referring to FIGS. 4 and 5, the first polishing assembly 30 of the embodiment is shown. The first polishing assembly 30 includes a driving member 31, a dust-proofing member 33, an eccentric subassembly 35 and a disc sander 37. The driving member 31 is mounted on one first side wall 11 of the support base 10. The driving member 31 includes a driving shaft 311 and an outlet nose 313. In the embodiment, the driving member 31 is an air motor.

The dust-proofing member 33 is mounted on the driving member 31. The dust-proofing member 33 includes a vacuum suction portion 331 and an evacuating portion 333. The vacuum suction portion 331 is in a hollow basin shape, and sleeved on the driving shaft 311. The evacuating portion 333 extends outwardly from a side of the vacuum suction portion 331 and connects with an external dust-collection mechanism (not shown).

The eccentric subassembly 35 extends through the dust-proofing member 33 and is fastened to the driving shaft 311 of the driving member 31. The eccentric subassembly 35 includes an eccentric connecting member 351 and a bearing 353. The eccentric connecting member 351 is fixed to the driving shaft 311 and is partially received in the vacuum suction portion 331 of the dust-proofing member 33. The eccentric connecting member 351 is in a hollow stepped basin shape, and includes an eccentric portion 3511 and a connecting portion 3513. The eccentric portion 3511 is coaxially connected to the connecting portion 3513, and eccentrically defines a mounting groove 3515. The connecting portion 3513 defines a connecting hole 3517 extending through opposite ends thereof. The connecting hole 3517 is coaxial with the connecting portion 3513 and communicates with the mounting groove 3515. The connecting portion 3513 is connected to the driving shaft 311, and the driving shaft 311 is received in the connecting hole 3517. The bearing 353 is received in the mounting groove 3515, the outer ring of the bearing 353 is connected to the side wall of the mounting groove 3515.

In the embodiment, the eccentric subassembly 35 further includes a fixing member 357 and a connecting member 359. The fixing member 357 is in a "T" shape and fixed to an inner ring of the bearing 353. The fixing member 357 defines a through hole 3571. The connecting member 359 includes a main portion 3591 and a fixing portion 3593 connected to an end of the main portion 3591. The fixing portion 3593 is received in the through hole 3571 and fixed to the fixing member 357.

The disc sander 37 is fixed to the connecting member 359. The disc sander 37 is capable of auto-rotating synchronously when it is rotated by the eccentric subassembly 35, thus the friction between the disc sander 37 and the workpiece 200 can be adjusted via the self-adaptive auto-rotating of the disc sander 37.

Figure 6:
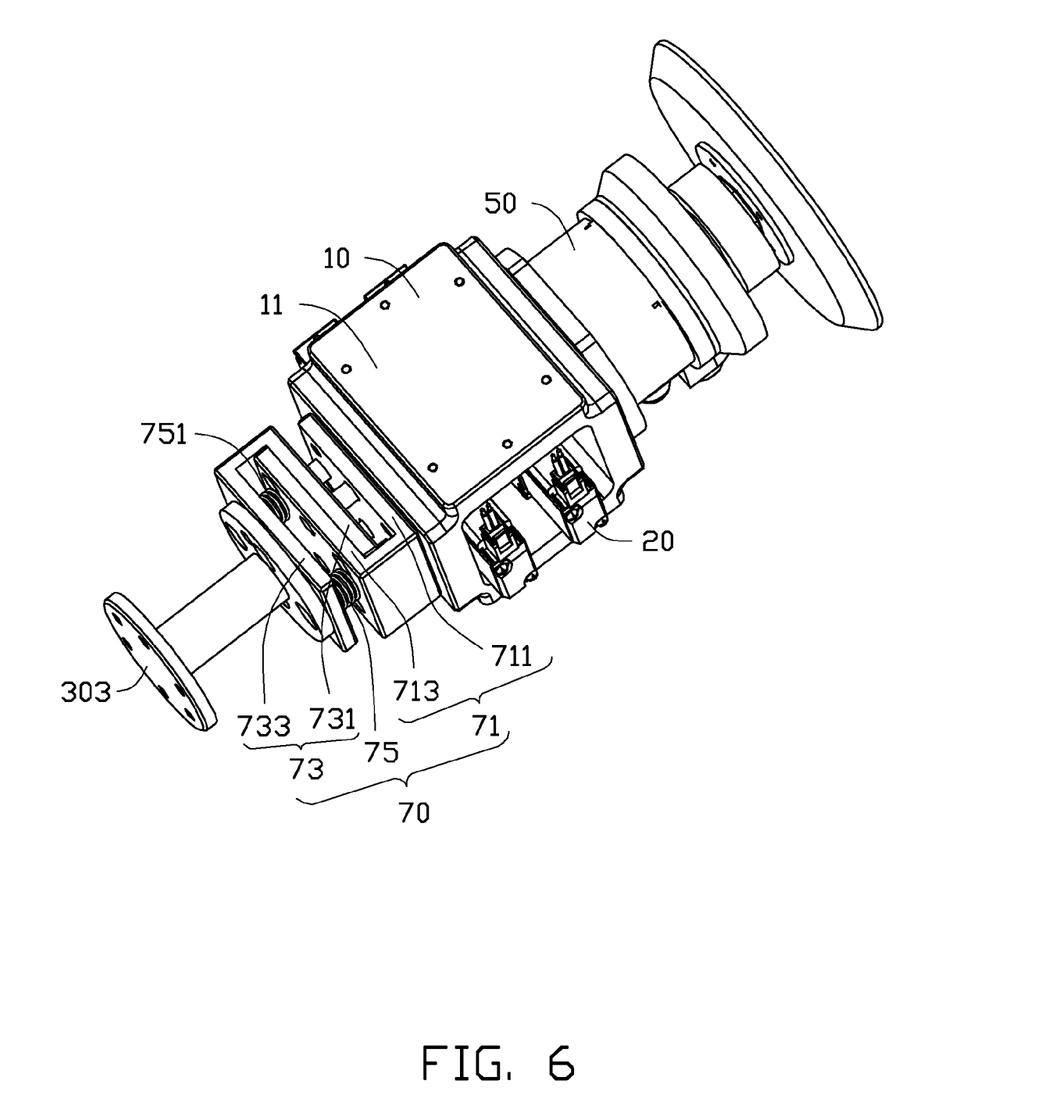
FIG. 6 is an assembled, isometric view of the polishing mechanism of FIG. 2 removing the first polishing assembly and a shielding cover.

Referring to FIGS. 5 and 6, the second polishing assembly 50 is similar to the first polishing assembly 30 in structure. The difference between the two polishing assemblies is that a size of the disc sander 37 of the second polishing assembly 50 is greater than that of the first polishing assembly 30.

The adjusting assembly 70 is mounted on the second side wall 13 of the support base 10. The adjusting assembly 70 includes a first adjusting member 71, a second adjusting member 73, a plurality of guiding rods 75 located between the first adjusting member 71 and the second adjusting member 73, and a plurality of elastic members 751 sleeved on the plurality of guiding rods 75 respectively. The first adjusting member 71 and the second adjusting member 73 are both in a "C" shape, and facing each other and partially receiving each other. The first adjusting member 71 includes a first connecting portion 711 and a second connecting portion 713 parallel to the first connecting portion 711. The second adjusting member 73 includes a first mounting portion 731 and a second mounting portion 733 parallel to the first mounting portion 731. The first connecting portion 711 is fixed to the second side wall 13 of the support base 10. The first mounting portion 731 is received between the first connecting portion 711 and the second connecting portion 713, and abuts against the second connecting portion 713. The second mounting portion 733 is positioned away from the first connecting portion 711. Each guiding rod 75 is fixed to the first connecting portion 711 by one end thereof, the opposite end of the guiding rod 75 slidably extends through the second connecting portion 713, the first mounting portion 731 and the second mounting portion 733. The plurality of elastic members 751 are sleeved on the plurality of guiding rods 75 respectively, and are elastically resisted between the second mounting portion 733 and the second connecting portion 713.

Referring to FIG. 3 again, the shielding cover 90 is in a hollow square shape. The shielding cover 90 includes a main body 91 and a cover plate 93 assembled to the main body 91. The main body 91 defines a receiving chamber 910 for receiving the first polishing assembly 30, the second polishing assembly 50 and the adjusting assembly 70. The main body 91 includes a pair of first walls 911 and a pair of second walls 913 perpendicular to the pair of first walls 911. One first wall 911 is smoothly connected to one second wall 913 and defines a first mounting hole 9112 for allowing the first polishing assembly 30 to pass through. The second wall 913 which smoothly connects to the first wall 911 defines a second mounting hole 9132 for allowing the second polishing assembly 50 to pass through. The other second wall 913 defines a connecting hole 9133 for the adjusting assembly 70. The cover plate 93 is assembled to the main body 91 to seal the receiving chamber 910.

When in assembly, the pair of magnetic valves 20 are mounted in the support base 10 and connected to the electric cabinet of the arm 301. The first polishing assembly 30 and the second polishing assembly 50 are mounted on the support base 10 and electrically connected to the pair of magnetic valves 20 respectively. The support base 10, the first polishing assembly 30, the second polishing assembly 50, and the pair of magnetic valves 20 are received in the receiving chamber 910 of the main body 91. The adjusting assembly 70 is fixed to the support base 10 and connected to the arm 301 via the flange 303. The cover plate 93 seals the receiving chamber 910 to accomplish the assembling of the manipulator 300.

Referring to FIG. 7, when in use, the workpiece 200 is fittingly fixed. The manipulator 300 drives the polishing mechanism 100 to move below the workpiece 200. The first polishing assembly 30 is controlled by one magnetic valve 20 to polish the top surface 205 of the workpiece 200. When the manipulator 300 drives the polishing mechanism 100 to move toward a periphery of the workpiece 200, the first polishing assembly 30 polishes an outer surface of the sidewall 203 of the workpiece 200. When the manipulator 300 drives the polishing mechanism 100 to move above the workpiece 200, the second polishing assembly 50 polishes an outer surface of the base wall 201 of the workpiece 200. The burrs that are formed on the top surface 205, the sidewall 203, and the base wall 201 of the workpiece 200 are removed by the polishing mechanism 100. The adjusting assembly 70 can adjust the amount of pressing force of the polishing mechanism 100 on the workpiece 200 when working.

When the pressing force exerted on the workpiece 200 is sufficient enough, the adjusting assembly 70 may be omitted. The fixing member 357 and the connecting member 359 may be omitted, and the disc sander 37 can be directly connected to the bearing 353.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A manipulator configured for polishing one or more workpiece, comprising:
   an arm;
   a polishing mechanism mounted on the arm, the polishing mechanism comprising:
      a support base;
      a pair of magnetic valves mounted in the support base;
      a first polishing assembly; and
      a second polishing assembly, wherein the first polishing assembly and the second polishing assembly are separately mounted on the support base, the second polishing assembly is perpendicular to the first polishing assembly, the first and the second polishing assemblies are connected to the pair of magnetic valves respectively, and controlled by the pair of magnetic valves respectively to polish the one or more workpiece.

2. The manipulator of claim 1, wherein the first polishing assembly comprises a driving member, an eccentric subassembly and a disc sander, the driving member is mounted on the support base, the disc sander is connected to the driving member eccentrically via the eccentric subassembly.

3. The manipulator of claim 2, wherein the driving member comprises a driving shaft and an outlet nose, the eccentric subassembly comprises an eccentric connecting member and a bearing, the eccentric connecting member is fixed to the driving shaft and defines a mounting groove thereon eccentrically, the bearing is received and fixed in the mounting groove, the disc sander is connected to the bearing via the eccentric connecting member.

4. The manipulator of claim 3, wherein the eccentric connecting member comprises an eccentric portion and a connecting portion, the mounting groove is eccentrically defined on the eccentric portion, the connecting portion is coaxially connected to the eccentric portion and coaxially defines a connecting hole thereon, the connecting hole communicates with the mounting groove, the driving shaft of the driving member is fixedly received in the connecting hole of the connecting portion.

5. The manipulator of claim 4, wherein the first polishing assembly further comprises a dust-proofing member, the dust-proofing member comprises a vacuum suction portion and an evacuating portion extends outwardly from a side of the vacuum suction portion, the eccentric connecting member is partially received in the vacuum suction portion of the dust-proofing member, the driving shaft extends through the dust-proofing member and connects with the eccentric connecting member.

6. The manipulator of claim 3, wherein the eccentric subassembly further comprises a fixing member and a connecting member, the fixing member is connected to the bearing and defines a through hole thereon, the connecting member comprises a main portion and a fixing portion connected to an end of the main portion, the fixing portion is fixedly received in the through hole of the fixing member, the disc sander is fixed on the main portion.

7. The manipulator of claim 3, further comprising an adjusting assembly mounted on the support base opposite to the second polishing assembly, wherein the adjusting assembly comprises a first adjusting member, a second adjusting member, a plurality of guiding rods located between the first adjusting member and the second adjusting member, and a plurality of elastic members sleeved on the plurality of guiding rods respectively, the first adjusting member is mounted on the support base, the second adjusting member is connected to the arm, the second adjusting member is guided by the plurality of guiding rods and capable of moving relative to the first adjusting member, the plurality of elastic members are elastically resisted between the first and the second adjusting members.

8. The manipulator of claim 7, wherein the first adjusting member comprises a first connecting portion and a second connecting portion parallel to the first connecting portion, the second adjusting member comprises a first mounting portion and a second mounting portion parallel to the first mounting portion, the first mounting portion is received between the first connecting portion and the second connecting portion, and abuts against the second connecting portion.

9. The manipulator of claim 8, wherein each guiding rod is fixed to the first connecting portion by an end thereof, the opposite end of the guiding rod slidably extends through the second connecting portion, the first mounting portion and the second mounting portion, the plurality of elastic members are sleeved on the plurality of guiding rods respectively and are elastically resisted between the second mounting portion and the second connecting portion.

10. The manipulator of claim 1, further comprising a shielding cover, wherein the shielding cover comprising a main body and a cover plate, the main body defines a receiving chamber thereon, the support base is received in the receiving chamber, the first and the second polishing assemblies are partially received in the receiving chamber, the cover plate is assembled to the main body to seal the receiving chamber.

11. The manipulator of claim 1, wherein the support base comprises a pair of first side walls, a second side wall and a third side wall, the pair of first side walls are spaced from and parallel to each other, the second side wall and the third side wall are spaced from and parallel to each other, the pair of the first side walls, the second wall and the third wall cooperatively substantially form a rectangular shaped structure, the first polishing assembly is mounted on one first side wall, the second polishing assembly is mounted on the third sidewall, and the adjusting assembly is mounted on the second side wall.

12. A polishing mechanism for polishing one or more workpiece, comprises:
   a support base;
   a pair of magnetic valves mounted in the support base;
   a first polishing assembly; and
   a second polishing assembly, wherein the first polishing assembly and the second polishing assembly are separately mounted on the support base, the second polishing assembly is perpendicular to the first polishing assembly, the first and the second polishing assemblies are connected to the pair of magnetic valves respectively, and controlled by the pair of magnetic valves respectively to polish one or more workpiece.

13. The polishing mechanism of claim 12, wherein the first polishing assembly comprises a driving member, an eccentric subassembly and a disc sander, the driving member is mounted on the support base, the disc sander is connected to the driving member eccentrically via the eccentric subassembly.

14. The polishing mechanism of claim 13, wherein the driving member comprises a driving shaft and an outlet nose, the eccentric subassembly comprises an eccentric connecting member and a bearing, the eccentric connecting member is fixed to the driving shaft and eccentrically defines a mounting groove thereon, the bearing is fixedly received in the mounting groove, the disc sander is connected to the bearing.

15. The polishing mechanism of claim 14, wherein the eccentric connecting member comprises an eccentric portion and a connecting portion, the mounting groove is eccentrically defined on the eccentric portion, the connecting portion is coaxially connected to the eccentric portion and coaxially defines a connecting hole thereon, the connecting hole communicates with the mounting groove, the driving shaft of the driving member is fixedly received in the connecting hole of the connecting portion.

16. The polishing mechanism of claim 15, wherein the first polishing assembly further comprises a dust-proofing member, the dust-proofing member comprises a vacuum suction portion and an evacuating portion extends outwardly from a side of the vacuum suction portion, the eccentric connecting member is partially received in the vacuum suction portion of the dust-proofing member, the driving shaft extends through the dust-proofing member and connects with the eccentric connecting member.

17. The polishing mechanism of claim 14, wherein the eccentric subassembly further comprises a fixing member and a connecting member, the fixing member is connected to the bearing and defines a through hole thereon, the connecting member comprises a main portion and a fixing portion connected to an end of the main portion, the fixing portion is fixedly received in the through hole of the fixing member, the disc sander is fixed on the main portion.

18. The polishing mechanism claim 14, further comprising an adjusting assembly mounted on the support base opposite to the second polishing assembly, wherein the adjusting assembly comprises a first adjusting member, a second adjusting member, a plurality of guiding rods located between the first adjusting member and the second adjusting member, and a plurality of elastic members sleeved on the plurality of guiding rods respectively, the first adjusting member is mounted on the support base, the second adjusting member is connected to the arm, the second adjusting member is guided by the plurality of guiding rods and capable of moving relative to the first adjusting member, the plurality of elastic members are elastically resisted between the first and the second adjusting members.

19. The polishing mechanism of claim 18, wherein the first adjusting member comprises a first connecting portion and a second connecting portion parallel to the first connecting portion, the second adjusting member comprises a first mounting portion and a second mounting portion parallel to the first mounting portion, the first mounting portion is received between the first connecting portion and the second connecting portion, and abuts against the second connecting portion.

20. The polishing mechanism of claim 19, wherein each of the plurality of guiding rods is fixed to the first connecting portion by an end thereof, the opposite end of the guiding rod slidably extends through the second connecting portion, the first mounting portion and the second mounting portion, the plurality of elastic members are sleeved on the plurality of guiding rods respectively and resisted between the second mounting portion and the second connecting portion.

* * * * *